W. WILMINGTON.
Grain Separator.
No. 26,316.
Patented Nov. 29, 1859.
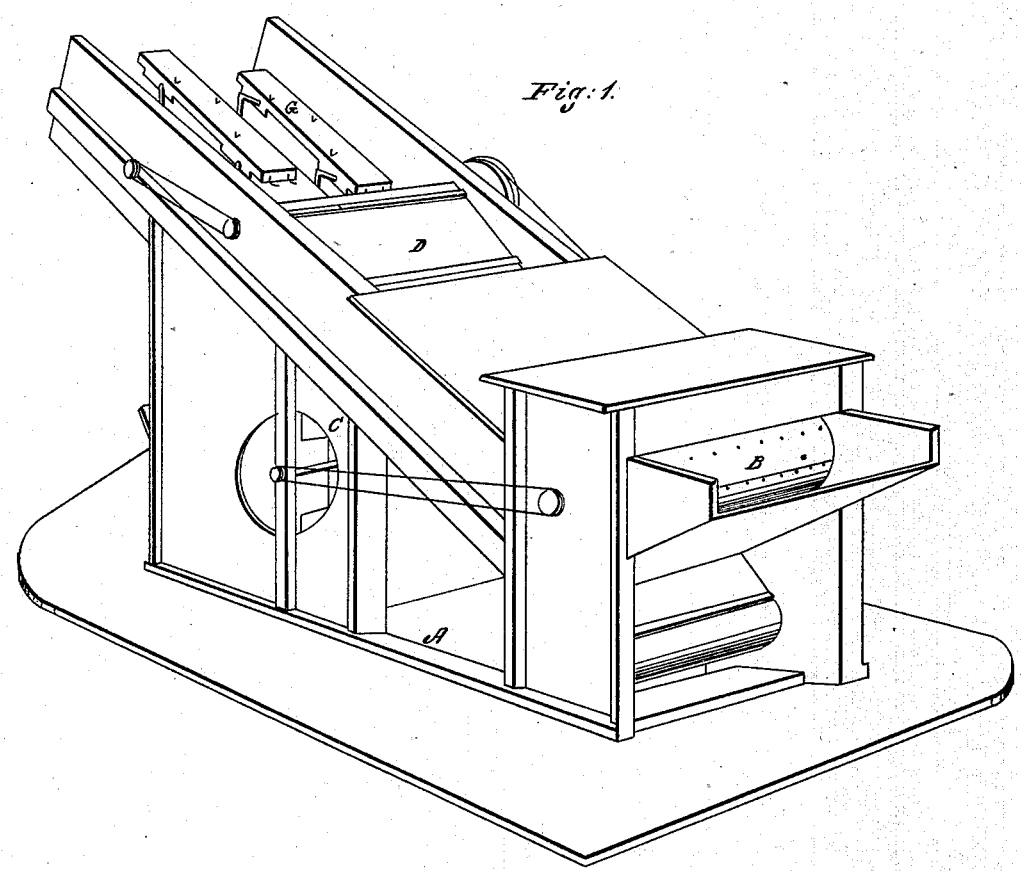
Fig. 1.
Fig. 2.
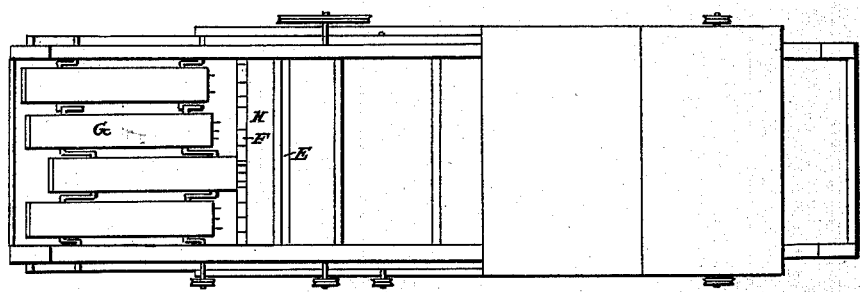
Witnesses:
Franklin T. Card
John L. Johnson
Inventor:
William Wilmington

UNITED STATES PATENT OFFICE.

WILLIAM WILMINGTON, OF TOLEDO, OHIO.

GRAIN-SEPARATOR.

Specification of Letters Patent No. 26,316, dated November 29, 1859.

*To all whom it may concern:*

Be it known that I, WILLIAM WILMINGTON, of Toledo, in the county of Lucas and State of Ohio, have invented a new and useful Improvement on a Machine for Separating Grain from Straw; and I do hereby declare that the following is a full, clear, and exact description of the construction and operation of the same, reference being had to the annexed drawings, making a part of the specification, in which—

Figure one (1) is a perspective view, and Fig. two (2) is a plan.

Letter A, represents the main frame. B the threshing cylinder. C, fan blower. D endless belt or elevator, E, opening for grain to fall through on riddles or wind board. F, comb or fingers of sufficient size to admit the grain that may be carried back by the action of the teeth on the end and lower side of the bars. G, bars with teeth projecting from the upper and lower side having a reciprocating motion imparted to them by the action of the double cranks. H, dividing board, to prevent the grain from being thrown upon the bars from the elevator. There may be a revolving beater placed between the elevator and the bars to lift the straw from the elevator, but when it can be dispensed with, I prefer to do so.

Operation: The unthreshed grain and straw, having been fed to the threshing cylinder is discharged upon the endless belt or elevator and then carried onward by the revolving motion of the same and the straw is then thrown upon the reciprocating bars and by them discharged from the machine. The grain that lies on the elevator or belt is carried back and discharged through the opening, E, upon the riddles or wind board. The grain remaining in the straw is, by the movement of the cranks and bars, separated from the straw, and falls between the spaces of the bars to the bottom board, and by the backward movements of the bars on the lower cranks is returned, and discharged through the openings of the comb or fingers G, and falls upon the riddles or wind board. The short straws, that may fall between the bars, are prevented from falling upon the riddles or wind board by the interposition of the comb or fingers. The projecting teeth on the under side and end of the bars prevent the openings of the comb from filling up with straw or chaff.

The object of the separating board H, is to prevent a return of the straw and chaff, to the belt D, after it has once been carried up by said belt and deposited upon the bars G. Although a portion of the straw or chaff which falls through after being received by the bars G, may be worked back toward the belt by means of the teeth on the underside of the bars, said straw or chaff is prevented from coming in contact with the belt by means of the board H, as is clearly seen. The straw after passing back to the board, and over the openings F, is raised up and carried away on top of the bars G.

I do not claim the cranks, and bars, nor do I claim the endless belt or elevator, but What I do claim, and desire to secure by Letters Patent is—

1. The combination of the endless belt D, the dividing board H, and the rotary reciprocating bars G, the belt being separated from the bars by means of the board H, and used for delivering the straw and unseparated grain to the bars at its turning point substantially as and for the purpose herein specified.

2. I claim the combination of the teeth on the underside and end of the bars, with the fingers or comb for the purpose hereinbefore described.

WILLIAM WILMINGTON.

Witnesses:
FRANKLIN E. CARD,
JOHN L. JOHNSON.